Figure 1:
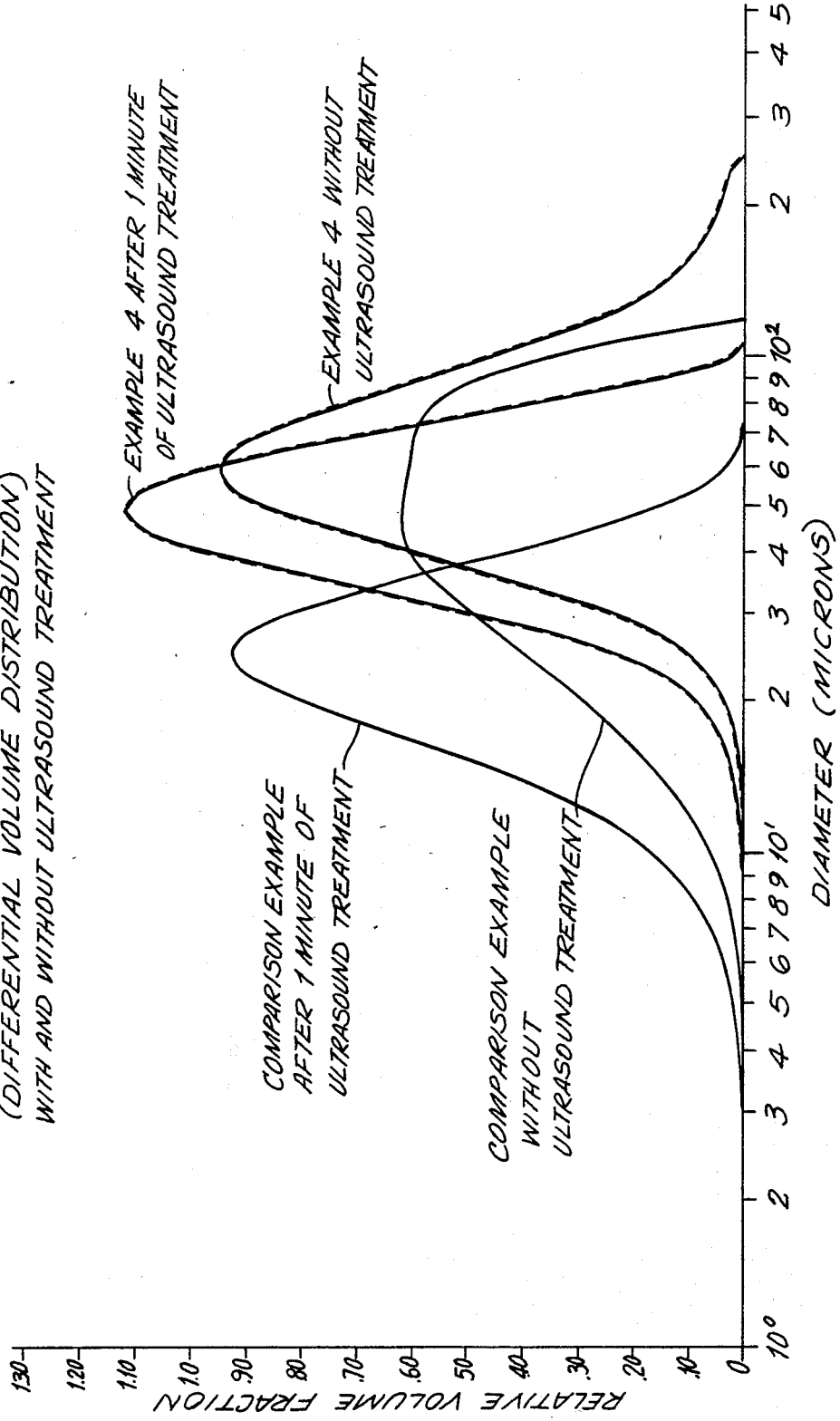
Figure 2:
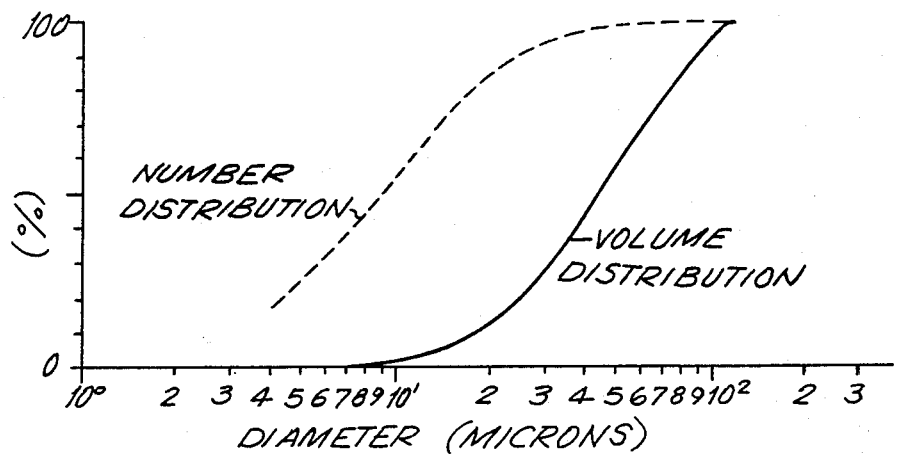
Figure 3:
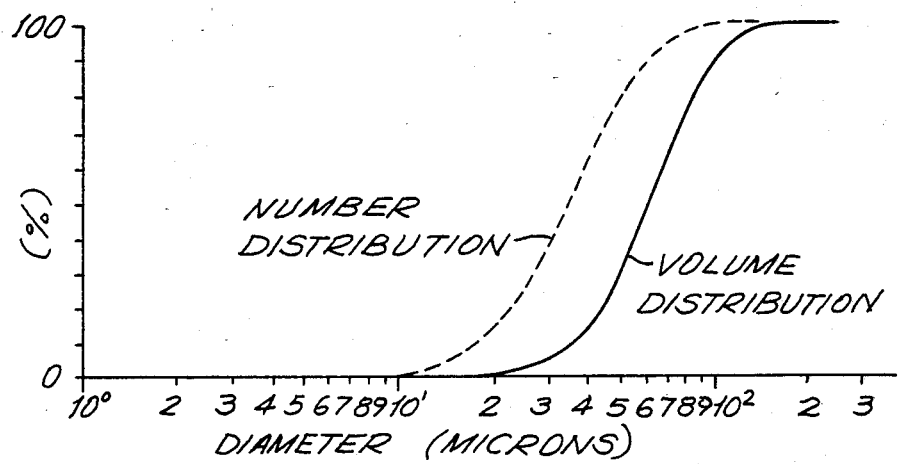
Figure 4:
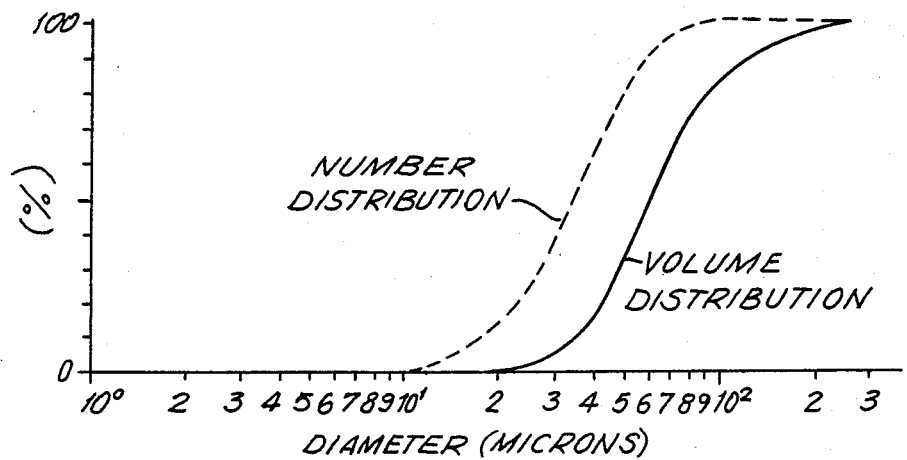
Figure 5:
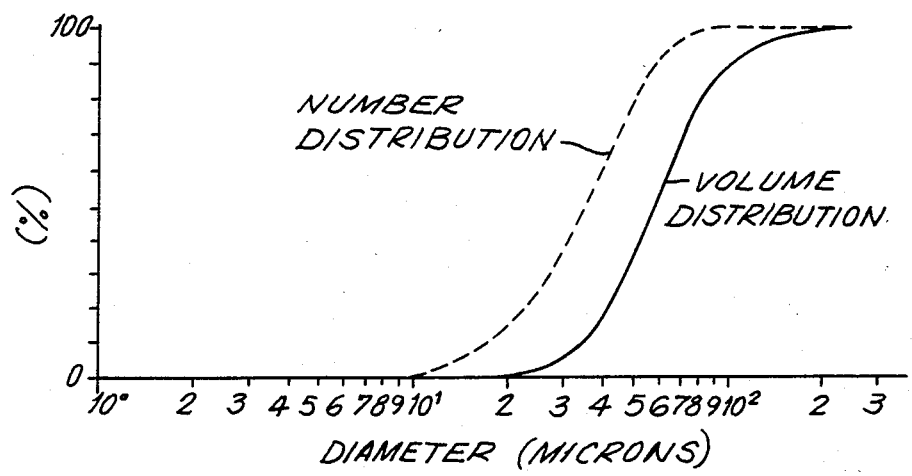

United States Patent [19]

Klesse et al.

[11] Patent Number: 4,892,910

[45] Date of Patent: Jan. 9, 1990

[54] POLYMER POWDERS OF LOW FINES CONTENT AND METHOD FOR MAKING THE SAME BY SPRAY DRYING

[75] Inventors: Wolfgang Klesse, Mainz; Hubert Rauch, Weiterstadt; Peter J. Arndt, Seeheim-Jugenheim; Norbert Suetterlin, Muehital-Nieder-Beerbach, all of Fed. Rep. of Germany

[73] Assignee: GmbH Röhm, Darmstadt, Fed. Rep. of Germany

[21] Appl. No.: 218,808

[22] Filed: Jul. 13, 1988

[30] Foreign Application Priority Data

Jul. 17, 1987 [DE] Fed. Rep. of Germany ....... 3723668

[51] Int. Cl.$^4$ .................. B01D 1/18; C08L 33/00
[52] U.S. Cl. ..................... 525/221; 525/198; 525/204; 525/218; 525/228; 525/230; 523/342; 264/12
[58] Field of Search ............... 523/340, 342; 524/501; 525/228, 204, 218, 221, 230, 190; 264/12

[56] References Cited

U.S. PATENT DOCUMENTS

| | | | |
|---|---|---|---|
| 3,998,768 | 12/1976 | Pettit | 525/223 |
| 4,071,653 | 1/1978 | Boessler et al. | 428/332 |
| 4,112,215 | 9/1978 | Boessler et al. | 528/503 |
| 4,151,138 | 4/1979 | Citrone | 524/475 |
| 4,169,737 | 10/1979 | Burke | 524/501 |
| 4,199,486 | 4/1980 | Boessler et al. | 260/31.8 M |
| 4,268,636 | 5/1981 | Iizuka | 525/228 |
| 4,433,076 | 2/1984 | Bauer et al. | 523/342 |
| 4,520,172 | 5/1985 | Lehmann et al. | 525/369 |
| 4,522,959 | 6/1985 | Linder | 525/228 |
| 4,722,595 | 2/1988 | Siol | 350/353 |
| 4,737,357 | 4/1988 | Lehmann et al. | 424/487 |

FOREIGN PATENT DOCUMENTS

| | | |
|---|---|---|
| 0030590 | 6/1981 | European Pat. Off. . |
| 2629924 | 1/1977 | Fed. Rep. of Germany . |
| 2101808 | 9/1984 | Fed. Rep. of Germany . |
| 3344242 | 6/1985 | Fed. Rep. of Germany . |
| 3495651 | 8/1985 | Fed. Rep. of Germany . |
| 3436477 | 4/1986 | Fed. Rep. of Germany . |
| 0847164 | 9/1984 | South Africa . |
| 1365581 | 9/1974 | United Kingdom . |

*Primary Examiner*—Lewis T. Jacobs
*Assistant Examiner*—David Buttner
*Attorney, Agent, or Firm*—Curtis, Morris & Safford

[57] ABSTRACT

Polymer powders comprising aggregated polymer particles, said powders having a low content of fines and being suitable as processing aids in the manufacture of polyvinyl chloride, are made by spray drying an aqueous dispersion (latex) of two emulsion polymers, one of which has a dynamic glass transition temperature above 90° C. and the other of which has a dynamic glass transition below 105° C., the latter being at least 10 K. degrees below the former.

7 Claims, 3 Drawing Sheets

PARTICLE SIZE DISTRIBUTION - COMPARISON EXAMPLE

PARTICLE SIZE DISTRIBUTION - EXAMPLE 1

PARTICLE SIZE DISTRIBUTION - EXAMPLE 3

PARTICLE SIZE DISTRIBUTION - EXAMPLE 4

POLYMER POWDERS OF LOW FINES CONTENT AND METHOD FOR MAKING THE SAME BY SPRAY DRYING

The present invention relates to powders having a low fines content and useful as processing aids in the manufacture of polyvinyl chloride (PVC), said powders being composed of grains of aggregated latex particles of two different polymers, and to a method of making such powders by spray drying an aqueous dispersion (emulsion) of latex particles of two polymers having different dynamic glass transition temperatures.

The prior art

Spray-dried emulsion-polymer powders are known. Some them have a very low glass transition temperature and are mixed with anticaking agents to prevent the powder particles from sticking together during storage. (See German patent No. 33 44 242.)

In contrast to these soft powders, the invention relates powders which are predominantly composed of hard emulsion polymers having a dynamic glass transition temperature of over 90° C. The spray drying of such emulsion polymers is also known. For example, according to German patent No. 26 29 924, aqueous dispersions emulsion polymers having a minimum film-forming temperature at ranges from 20° to 80° C. are spray-dried with the addition of a wax to a redispersible powder. However, in most end uses of spray-dried emulsion polymers the presence of a wax is undesirable.

Examples of spray-dried emulsion polymers with a dynamic glass transition temperature of over 90° C. are the PVC processing aids known from German patent No. 21 01 808. They consist of a powder whose grains are composed of loosely aggregated fine particles. This grain structure is obtained when the underlying aqueous dispersion of the emulsion polymer is spray-dried at a relatively low outlet air temperature so that the latex particles in the individual droplets or powder grains are not heated to the melting or sintering temperature. The loose, fine structure has a favorable effect on the processing properties of the PVC processing aid. However, it has the drawback that in spray drying a sizable fraction of extremely fine powder grains is produced. Since this fine fraction is not completely held back in the cyclone separator of the spray-drying unit, it results in yield losses and in atmospheric pollution by the polymer dust given off. The handling of the powdered product can also entail objectionable dusting.

While these drawbacks can be avoided simply by raising the temperature in the spray dryer so that the latex particles in the powder grains fuse together, this reduces their decomposability, which gives rise to difficulties as they are being worked into PVC molding compositions, for example. It is extremely difficult to control the temperature in the spray dryer with such precision that the latex particles in the powder grains will sinter together exactly to the point where no difficultly separable fines are produced and no dust-forming attrition occurs in handling while on the other hand the particles are decomposed rapidly and completely on being incorporated in PVC molding compositions.

According to German patent No. 34 05 651, spray-dried emulsion polymers with a reduced content of fines are obtained from bimodal synthetic-resin dispersions. Mixtures of such dispersions with differing compositions can also be spray-dried. However, nothing is said in that patent with regard to what might be accomplished by using such a mixture. A further reduction of the fines content of these powders, too, is desirable.

THE OBJECT AND THE INVENTION

Thus there has been a need to develop and to produce in high yield spray-dried emulsion polymers in the form of non-dusting but readily decomposable powders made up of grains essentially composed solely of aggregated latex particles of emulsion polymers. Minor amounts of auxiliary agents which are usually present in aqueous latices, such as emulsifiers or salts, need not be excluded in the production of the powder.

It has been found that spray-dried emulsion polymers in nondusting form can be produced in high yield when the powder grains are composed of aggregated latex particles of at least two different emulsion polymers (A) and (B), of which (A) is present in a larger amount than (B), and of which the emulsion polymer (A) has a dynamic glass transition temperature ($T_{lambda\,max}$) of over 90° C., and preferably over 110° C., and the emulsion polymer (B) has a dynamic glass transition temperature of less than 105° C, and preferably less than 90° C.

The effect of an addition of polymer (B) on the yield in spray drying is apparent from the comparative values given below. Latices of the following emulsion polymers (A) and (B) were used:

| | |
|---|---|
| (A) 1: | 68.2% styrene |
| | 27.0% methyl methacrylate |
| | 3.0% ethyl acrylate |
| | 1.8% ethylene glycol dimethacrylate |
| | $T_{lambda\,max}$: 125° C. |
| (A) 2: | 47.5% methyl methacrylate |
| | 47.5% isobutyl methacrylate |
| | 5.0% ethylene glycol dimethacrylate |
| | $T_{lambda\,max}$: 102° C. |
| (B) 1: | 65.0% methyl methacrylate |
| | 34.0% butyl acrylate |
| | 1.0% methacrylic acid |
| | $T_{lambda\,max}$: 60° C. |
| (B) 2: | 100% isobutyl methacrylate |
| | $T_{lambda\,max}$: 80° C. |

In spray drying, the following throughputs and yields of dry powdered product were obtained:

| Latex or mixture | Throughput in kg/hr calculated as solid substance | Yield in percent of solid feed |
|---|---|---|
| 100% (A) 1 | 80 | 75 |
| 100% (A) 1 | 120 | 75 |
| 95% (A) 1 + 5% (B) 1 | 162 | 96 |
| 100% (A) 2 | 137 | 88 |
| 100% (A) 2 | 162 | 87 |
| 95% (A) 2 + 5% (B) 2 | 162 | 93 |

In both cases, it proved possible to fully utilize the drying capacity of the spray dryer and to obtain a significant increase in yield with the dispersion of the mixture (A)+(B). The reduction in dust formation was striking.

For the decomposability of the spray-dried emulsion polymer it is essential that the latex particles of the emulsion polymer be preserved in aggregated form in the powder grains. However, the object of the invention is not accomplished if the latex particles loosely adhere to one another solely due to surface forces and can be separated from one another even by very weak mechanical forces. On the other hand, the latex particles should not be completely fused together to form a glassy mass that appears translucent under the microscope. Rather, the latex particles should be sintered or welded only in spots to adjacent particles within the same powder grain. Under the microscope, the powder grains appear as a white or slightly translucent mass. On being crushed, the grains offer practically no perceptible resistance to their being broken down and can be smeared onto a solid substrate as a level coating.

This structure of the spray-dried emulsion-polymer powders of the invention is due to the differing properties of the latex particles (A) and (B) which go into their makeup. In spray drying, the (A) particles remain below the static glass transition temperature and therefore do not sinter or weld together on coming into contact with one another. Because of their lower glass transition temperature, the (B) particles, on the other hand, soften at a temperature at which the (A) particles are still hard. When the (B) particles make contact with (A) particles or with other (B) particles under spray-drying conditions, spot welds or bonds form which consolidate the powder grain without letting it melt into a homogeneous mass. Such an undesirable complete fusing together of all particles is prevented primarily by the preponderance of (A) particles.

While a uniform state of incipient fusing together of the individual latex particles can be achieved in an emulsion polymer of homogeneous composition only over an extremely narrow temperature range in spray drying, the range over which the desired state of sintering is obtained can be readily established in the spray drying of a dispersion composed of the polymers (A) and (B). Surprisingly, the addition of just one percent or less of polymer (B) will increase the yield in spray drying by several percent to more than 90 percent. Still more surprisingly, the decomposability of the powder is better than that of a powder containing (A) alone and forming much dust, although the more pronounced melting might have seemed to indicate that it would be more difficult to bring about decomposition. For example, in the processing of a clear PVC molding composition with a powder of homogeneous composition (A), still undecomposed particles or streaks will be discernible in many cases after the usual processing time. Under identical processing conditions, the inventive powders result in fewer flaws of this type, if any.

Evidently, the properties of the spray dried powder are attributable to the physical properties of the emulsion polymers therein: the chemical composition of the polymers is, thus, of subordinate interest providing that the polymers have the required dynamic glass transition temperatures. In the same way, the method of the invention involves the selection of certain physical conditions, such as the spray drying temperature, in dependence on the dynamic glass transition temperatures of the participating polymers.

The products made by the invention and the method for their manufacture thus can be comprehensively characterized by the dynamic glass transition temperatures and the amounts of the polymers making up the powders and by the spray drying temperature appropriates to these transition temperatures. The compositions of suitable emulsion polymers having any desired dynamic glass transition temperature are generally known in the art.

Practice of the invention

The invention is not limited to PVC processing aids, although these are of primary interest. Similar troubles, such as yield losses, environmental pollution, and the nuisance posed by dust, can occur with any spray-dried emulsion polymer whose powder grains are made up of aggregated latex particles, in other words, of latex particles which are not fused together to form a hard mass. They offer the advantage that they dissolve more rapidly in organic solvents than do fused particles, and that with plasticizers they will give homogeneous plastisols or thermogelled coatings, as for pharmaceutical products, for example.

Thus, any emulsion polymer which has a dynamic glass transition temperature of over 90° C., and preferably over 110° C., and which can be utilized to advantage in the form of the described powders, can be used as polymer (A). The dynamic glass transition temperature ($T_{lambda\ max}$) is determined in conformity with DIN 53,445.

The static glass transition temperature $T_g$ is usually from 10 to 30 K lower than the dynamic glass transition temperature. For copolymers, its approximate value can be calculated from the known data of the homopolymers of the monomers going into them.

Typical emulsion polymers having a dynamic glass transition temperature of over 90° C. are composed of more than 50, and preferably from 70 to 100, percent by weight of monomers giving hard homopolymers and of less than 50, and preferably from 0 to 30, percent by weight of comonomers giving soft homopolymers. By hard homopolymers are meant those having a $T_g$ of over 60° C., and by soft homopolymers, those with a $T_g$ of less than 60° C. Examples of monomers of the first kind are methyl, ethyl, isopropyl, tert-butyl and cyclohexyl methacrylate, styrene, vinyltoluene, alpha-methylstyrene, acrylo- and methacrylonitrile, acrylic and methacrylic acid, maleic and itaconic acids, and vinyl chloride. Illustrative of monomers of the second kind are the alkyl esters of acrylic acid and the $C_3$ and higher alkyl esters of methacrylic acid, vinyl acetate, olefins, and vinyl alkyl ethers.

The known emulsion polymers of this type which are produced and used as spray dried powders include:

(1) PVC processing aids such as those in German patent publication No. 21 01 808 (=British patent No. 1,365,581) composed of 70 to 95 percent of methyl methacrylate and 5 to 30 percent of comonomers giving soft homopolymers, particularly $C_{1-8}$ alkyl acrylates, and having a reduced viscosity between 200 and 1000 ml/g;

(2) powdered binders for the production of coatings for pharmaceutical products according to U.S. Pat. Nos. 4,112,215 and 4,433,076, composed of copolymers of water soluble monomers such as unsaturated mon- oand di-carboxylic acids, aminoalkyl esters and aminoalkyl amides of such acids, their hydroxyalkyl esters and hydroxyalkyl amides, vinylpyrrolidone or vinylimidazole, and water insoluble monomers such as styrene, vinyl acetate, olefins, and $C_{1-10}$ alkyl esters of acrylic or methacrylic acid;

(3) redispersible powders for the production of coating dispersions for pharmaceutical products according to U.S. Pat. Nos. 4,520,172 and 4,737,357, which are copolymers containing from 15 to 80 percent by weight of monomers which form salts in the acid or alkaline range, such as unsaturated carboxylic acids or aminoalkyl-esters or -amides of such acids or from 5 to 20 percent of monomers having a quaternary ammonium salt group, the balance being water insoluble comonomers such as alkyl esters or acrylic acid or of methacrylic acid; and (4) polymer powders for the preparation of plastisols containing a plasticizer and manufactured according to U.S. Pat. No. 4,071,653 and U.S. Pat. No. 4,199,486, said polymers being composed of more than 50 percent of methyl methacrylate and a basic comonomer such as vinylimidazole, or of a core/shell emulsion polymer, the core consisting at least in part of acrylic esters or higher methacrylic esters, and the shell of more than 50 percent of methyl methacrylate.

To the extent that the patent publications cited describe also polymers having a $T_{lambda\ max}$ of less than 90° C., the use of the present invention is indicated only in the case of those with a $T_{lambda\ max}$ of over 90° C., since it is only with these that the dusting problems described are encountered. These become more severe as the dynamic glass transition temperature increases. Emulsion polymers which are typical for the invention have dynamic glass temperatures ranging from 100° to 180° C., and more particularly from 110° to 160° C.

The invention is particularly advantageous for cross-linked polymers (A), that is, polymers whose composition includes polyunsaturated vinyl monomers such as divinylbenzene, triallyl cyanurate, acrylic or methacrylic esters of polyhydric alcohols, or alkylene bis-acrylamides or methacrylamides, in amounts of from 0.01 to 10 percent by weight, for example. The polymers (B), on the other hand, preferably are not cross-linked.

The molecular weights of the emulsion polymers depend as usual on the end-use requirements. For example, the (weightaverage) molecular weight of an emulsion polymer to be used as a PVC processing aid may range from 500,000 to several million, and more particularly from 1 to 4 million.

The emulsion polymers (B) may be composed of the same monomers as the polymers (A), except that the proportion of monomers giving hard homopolymers should be reduced in favor of monomers giving soft homopolymers to such an extent that the dynamic glass transition temperature of the emulsion polymer is less than 105° C. and at least 10 K lower than the dynamic glass transition temperature of (A). While the object of the invention, that is, a higher spray-drying yield and reduced formation of fines, will be accomplished also when the compositions of the polymers (A) and (B) differ widely from each other, it is usually more advantageous so far as the use of the powders is concerned that the two polymers be highly compatible with each other. (See BrandrupImmergut, Polymer Handbook, 2nd ed. (1975), pp. 111–211, WileyInterscience, U.S. Pat. No. 4,722,595, and German patent publication No. 34 36 477. As a rule, compatibility is present when a clear film can be produced from a solution of the polymer blend. The more similar the compositions of the two polymers are, the more compatible the polymers will be. Preferably both polymers are composed of the same monomers; only their proportions are different, as described above.

Preferred products in accordance with the invention contain as (A) an emulsion polymer composed of 70 to 100 wt. % of at least one member selected from the group consisting of methyl methacrylate, styrene, acrylic acid, methacrylic acid, acrylonitrile, and methacrylonitrile, 0 to 20 wt. % of at least one alkyl acrylate or of at least one alkyl methacrylate different from methyl methacrylate, and 0 to 10 wt. % of another vinyl monomer copolymerizable therewith, and as (B) an emulsion polymer composed of 15 to 100 wt. % of at least one alkyl acrylate or of at least one alkyl methacrylate having more than 3 carbon atoms in the alkyl group, and 0 to 85 wt. % of another vinyl monomer, and in particular methyl methacrylate or styrene, that is copolymerizable therewith.

The difference between the dynamic glass transition temperatures of the polymers (A) and (B) should be at least 10K, and preferably at least 20K, but may be as high as 50K or even higher. If the difference is small, the spray-drying temperature will have to be controlled very accurately to obtain the desired degree of welding of the latex particles to one another. The dynamic glass transition temperature of polymer (B) advantageously ranges from 55° to 90° C. It may also be lower, although blocking of the powder during storage may then occur, especially with high proportions of (B).

As a rule, the end-use properties of the spray-dried powder are determined largely, if not exclusively, by polymer (A). It constitutes in every case the predominant proportion. The preferred quantitative ratio of (A) to (B) ranges from 80:20 to 99.5:0.5 parts by weight. The ratio may be the higher the lower the dynamic glass transition temperature of (B). In any case, the proportion of polymer (B) should be sufficiently high for bonding bridges to form between the latex particles of polymer (A). In most cases, this will occur with quantitative ratios ranging from 90:10 to 99:1.

The effectiveness of component (B) is dependent in some measure on the latex particle size. The size of the latex particles (A) in itself is not critical so long as sprayability is assured. Very fine dispersions with a high solids content are viscous and difficult to atomize. Coarse dispersions occasionally cause difficulties in spraying because of an inordinately high sensitivity to shear stresses. The optimum particle size for the emulsion polymers (A) to be used in accordance with the invention ranges from 0.1 to 1 micron. The particle size of polymer (B) may be of the same order of magnitude but preferably is not above it. (B) preferably has a smaller particle size than (A), with the particle-size ratio of (A) to (B) ranging preferably from 1.2:1 to 20:1 and more particularly from 1.5:1 to 10:1. The preferred latex particle size of (B) ranges from 0.03 to 0.5 micron. (Maximum value of distribution curve.)

The preparation of the latices of the emulsion polymers (A) and (B) is carried out in the usual manner, which need not be described here. The latices usually contain small amounts of auxiliary substances, mainly emulsifiers and salts, stemming from the decomposition of te initiators used in their preparation. When mixing the latices of (A) and (B), care should be taken to make certain that they are sufficiently compatible with each other. Limited aggregation of the latex particles is not always detrimental so long as proper atomization in the spray dryer is assured. Compatibility may be jeopardized by the presence in the latices of sizable amounts of oppositely charged emulsifiers.

The viscosity of the blend of the dispersions (A) and (B) used in spray drying is advantageously less than 1,000 mPa.s, which will generally be the case with solids contents under 60 weight percent and particle sizes of over 0.3 micron. Finer dispersions (A) require a lower solids content, for example, from 30 to 50 weight percent.

Spray drying is carried out conventionally. On the commercial scale, tall spray dryers are employed through which hot air usually flows from top to bottom cocurrently with the dispersion being injected. The latter is atomized through one or more nozzles, or preferably by means of a rapidly rotating apertured disk. The temperature of the entering hot air preferably ranges from 100° to 250° C. The properties of the spray-dried emulsion polymer are determined by the outlet air temperature, that is, the temperature at which the dried powder grains are separated from the air stream at the base of the spray dryer or in a cyclone separator. That temperature is preferably lower than the temperature at which the emulsion polymer (A) sinters or melts, which permits at most a slight overshooting of the static glass transition temperature. On the other hand, the static glass transition temperature of polymer (B) should be exceeded so that the polymer will soften and exert its bonding action. If necessary, the dynamic glass transition temperature may also be exceeded, although this offers no advantages. In many cases, an outlet temperature of between 60° and 80° C. will be appropriate. Higher or lower temperatures may be employed, depending on the composition of the polymers (A) and (B).

The shear modulus (modulus of elasticity in shear) of the polymers (A) and (B) can serve as a basis for the exact adjustment of the outlet temperature. The latter is advantageously a value at which the shear modulus of polymer (A) is at least 800, and that of polymer (B) not over 800, and preferably not over 500, and most preferably not over 300, N/mm$^2$.

With a constant air stream, the outlet temperature can be controlled by varying the amount of dispersion continuously injected in unit time. When the proportion, the glass transition temperature and the particle size of polymer (B) as well as the temperature control in the dryer are optimally coordinated, a weakly sintered state will be achieved in the individual powder grains in which the latex particles are bonded firmly enough so that they will not undergo attrition with dust formation while on the other hand the bond will be sufficiently loose for the powder to dissolve readily and rapidly or to be homogeneously dispersed in a polyvinyl chloride melt.

The slight sintering of the latex particles within the powder grains manifests itself in several ways. The higher yield in spray drying is due to the reduced fraction of fines that cannot be completely separated from the air stream in the spray dryer and thus is partly lost. For the same reason, the handling of the powder in packaging, for example, entails much less dusting. This effect is usually apparent even without measurements of any kind. For example, when a flask filled only partly with powder is opened right after its content has been shaken up, a visible cloud of dust will escape if the powder is a conventional one, whereas the inventive powder will not give rise to any dust cloud, or then only to a faint one. The pronounced dust formation in the first case can be observed even inside the powder flask: The dust will only settle after 10 to 20 seconds and will leave a noticeable deposit on the glass walls. The inventive powder, on the other hand, will settle within just a few seconds and leave very much less of a dust film on the glass walls.

The reduced dusting is a lasting effect. While the powder consisting only of polymer (A) will give off steadily more fines through abrasion when moved mechanically, this effect is but slight with the powder in accordance with the invention. The stability of the powder grains under mechanical stress can be rendered visible by means of an ultrasonic treatment. To this end, 600 ml of an aqueous suspension of the powder in water was exposed in an 800-ml beaker for 10 seconds in an ultrasonic bath (Sonorex TK 52, manufactured by Bandelin) to ultrasonic irradiation at a radio frequency of 40 kHz and an RF power output of 50–100 watts. Before and after, the particle-size distribution was determined by measuring the absorbance of a suspension of the powder grains in water flowing through the measuring cell. (Kratel Partoscope F nephelometer of Kratel GmbH, Göttingen.) FIG. 1 shows the differential particle-size distribution before and after the ultrasonic treatment. The fraction of fines (particles of less than 10 microns) after the ultrasonic treatment is 5 volume percent for the conventional powder but only 0.5 volume percent for the inventive powder according to Example 1.

According to German Research Association bulletin XIX on "Maximum Concentrations and Threshold Limit Values for Substances in Workroom Air" of 1983, the important factor in an evaluation of dust behavior is the proportion of powder grains of a size of less than 10 microns. Particles of this size are capable of penetrating into the alveoli during inhalation and can cause damage. This is why the reduction of fine-dust formation is of major importance from the standpoint of industrial hygiene.

While the numerical fraction of fines in powders consisting solely of a type (A) polymer frequently amounts to more than 10 percent, and occasionally to more than 50 percent, it can be reduced by the addition of 5 percent of a type (B) polymer to one-tenth of that value or even less.

EXAMPLES

In the examples which follow, synthetic-resin dispersions having the following characteristics were used:

Dispersion (A) 3:

Polymer composition:
  95 wt. % methyl methacrylate
  5 wt. % ethyl acrylate
Emulsifier: 0.5 wt. % (based on monomer weight) of a $C_{15}$ paraffin sulfonate
Solids content: 50 wt. %
Particle diameter: 0.21 micron (weight average)
Molecular weight: 1.05 million (weight average)
Static glass transition temperature $T_g$: 96° C.
Dynamic glass transition temperature $T_{lambda\ max}$: 123° C.
Shear modulus at 69° C.: 1,150 N/mm$^2$ at 75° C.: 1,100 N/mm$^2$

Dispersion (B) 3:

Polymer composition:
  80 wt. % methyl methacrylate
  20 wt. % ethyl acrylate
Emulsifier: 0.5 wt. % (based on monomer weight) of a $C_{15}$ paraffin sulfonate
Solids content: 50 wt. %
Particle diameter: 0.16 micron (weight average)
Molecular weight: 950,000 (weight average)

Static glass transition temperature $T_g$: 71° C.
Dynamic glass transition temperature $T_{lambda\ max}$: 98° C.
Shear modulus at 75° C.: 700 N/mm²

Dispersion (B) 4:

Polymer composition:
  60 wt. % methyl methacrylate
  40 wt. % ethyl acrylate
Emulsifier: 0.5 wt. % (based on monomer weight) of a $C_{15}$ paraffin sulfonate
Solids content: 50 wt. %
Particle diameter: 0.16 micron (weight average)
Molecular weight: 820,000 (weight average)
Static glass transition temperature $T_g$: 41° C.
Dynamic glass transition temperature $T_{lambda\ max}$: 69° C.
Shear modulus at 69° C.: 20 N/mm²

| Example | Air temperature, °C. Inlet | Air temperature, °C. Outlet | Dispersion blend, parts by weight | Fines fraction of powder vol. % without ultrasonic | Fines fraction of powder vol. % with ultrasonic | % of particles without treatment | % of particles with treatment |
|---|---|---|---|---|---|---|---|
| Comparative | 140 | 70 | 100 (A)3 | 2 | 5 | 55 | 61 |
| 1 | 140 | 75 | 95 (A)3 + 5 (B)3 | <0.1 | 3.5 | <1 | 57 |
| 2 | 140 | 74 | 70 (A)3 + 30 (B)3 | <0.1 | 2 | <1 | 49 |
| 3 | 140 | 68 | 95 (A)3 + 5 (B)4 | <0.1 | 2 | <1 | 44 |
| 4 | 140 | 69 | 85 (A)3 + 15 (B)4 | <0.1 | 0.1 | <1 | 11 |

For the spray-dried powders according to the comparative example and Examples 1, 3 and 4, integral particle-size distribution curves (numerical and volume fractions) are appended as FIGS. 2 to 5.

In a photograph of the spray dried powder of Example 4 made with an electron microscope, unchanged spherical particles of polymer (A)3 as well as masses comprising sintered or fused latex particles of polymer (B)4 adhering to the spherical particles can be recognized.

EXAMPLES 5-8

In the following examples, synthetic resin dispersions having the following characteristics were used:

Dispersion (A) 4:

Polymer composition:
  86 wt. % methyl methacrylate
  12 wt. % butyl methacrylate
  2 wt. % N-vinylimidazole
Emulsifier: 0.5 wt. % (based on monomer) of a $C_{15}$ paraffin sulfonate
Solids content: 50 wt. %
Particle diameter: 0.3 micron
Molecular weight: 1.3 million (weight average)
Dynamic glass transition temperature $T\lambda_{max}$: greater than 100° C.
Static glass transition temperature $T_g$: 91° C.

Dispersion (B) 5:

Polymer composition:
  93.5 wt. % 2-ethylhexyl acrylate
  6 wt. % acrylonitrile
  0.5 wt. % N-methylolmethacrylamide
Emulsifier: 0.75 wt. % (based on monomer) sodium lauryl sulfate
  2.8 wt. % (based on monomer) isononylphenol-polyethyleneglycol ether, degree of oxyethylation=100
Solids content: 60 wt. %
Particle diameter: 0.5 micron
Dynamic glass transition temperature $T\lambda_{max}$: −38° C.

Dispersion (B) 6:

Polymer composition:
  99.5 wt. % butyl methacrylate
  0.5 wt. % methacrylic acid
Emulsifier: 0.26 wt. % (based on monomer) sodium lauryl sulfate
Solids content: 50 wt. %
Particle diameter: 0.4 micron
Dynamic glass transition temperature $T\lambda_{max}$: 41° C.
Static glass transition temperature $T_g$: 21° C.

Dispersion (A) 5:

Polymer composition:
  50 wt. % methyl methacrylate
  50 wt. % methacrylic acid
Emulsifier: 0.26 wt. % (based on monomer) sodium lauryl sulfate
Solids content: 41 wt. %
Particle diameter: 0.2 micron
Dynamic glass transition temperature $T\lambda_{max}$: 190° C.

Dispersion (A) 6:

Polymer composition:
  79.5 wt. % methyl methacrylate
  20 wt. % acrylonitrile
  0.5 wt. % methacrylic acid
Emulsifier: 0.8 wt. % (based on monomer) triisobutylphenolpolyglycol ether sulfate, sodium salt, degree of oxyethylation =7
Solids content : 40 wt. %
Particle diameter: 0.2 micron
Dynamic glass transition temperature $T\lambda m_{ax}$: 105° C.

Dispersion (B) 7

Polymer composition:
  69.8 wt. % ethyl acrylate
  30 wt. % methacrylic acid
  0.2 wt. % ethylene glycol dimethacrylate
Emulsifier: 1 wt. % (based on monomer) sodium lauryl sulfate
Solids content: 30 wt. %
Particle diameter: 0.14 micron
Dynamic glass transition temperature $T\lambda_{max}$: 65° C.
Static glass transition temperature $T_g$: about 55° C.

| Ex. | Air Temp. (°C.) Inlet | Air Temp. (°C.) Outlet | Dispersion Blend (parts by weight of solids) | Dust Formation + =dust free − = disturbing dust content |
|---|---|---|---|---|
| 5a | 200 | 90 | 100 (A)1 | − |
| 5b | 200 | 90 | 95 (A)1 + 5(B)5 | + |
| 6a | 140 | 68 | 100 (A)4 | − |
| 6b | 140 | 68 | 90 (A)4 + 10 (B)6 | + |
| 7a | 145 | 75 | 100 (A)5 | − |
| 7b | 145 | 75 | 85 (A)5 + 15 (B)7 | + |
| 8a | 140 | 73 | 100 (A)6 | − |

-continued

| | Spray drying process: | | |
|---|---|---|---|
| | Air Temp. (°C.) | Dispersion Blend | Dust Formation + = dust free − = disturbing |
| Ex. | Inlet Outlet | (parts by weight of solids) | dust content |
| 8b | 140   73 | 90 (A)6 + 10 (B)4 | + |

What is claimed is:

1. Powder grains consisting essentially of aggregated particles of two different polymers (A) and (B), wherein (1) 70 to 99.5 percent by weight of said powder grains comprise particles of polymer (A) having a dynamic glass transition temperature which is above 90° C., said particles of polymer (A) not being sintered together, and (2) 30 to 0.5 percent by weight of said powder grains comprise particles of polymer (B) having a dynamic glass transition temperature from 55° C. to 90° C. and which is at least 10 Centigrade degrees less than the dynamic glass transition temperature of polymer (A), said particles of polymer (B) being sintered to one another and to particles of polymer (A).

2. Powder grains as in claim 1 wherein the particles of polymer (B) are smaller in size than the particles of polymer (A).

3. Powder grains as in claim 1 wherein polymer (A) comprises
   70 to 100 percent by weight of at least one member selected from the group consisting of methyl methacrylate, styrene, acrylic acid, methacrylic acid, acrylonitrile, and methacrylonitrile;
   0 to 20 percent by weight of a member selected from the group consisting of alkyl acrylates and alkyl methacrylates other than methyl methacrylate; and
   0 to 10 percent by weight of another copolymerizable vinyl monomer different from the members of both of said groups.

4. Powder grains as in claim 1 wherein polymer (B) comprises from 15 to 100 percent by weight of an alkyl acrylate or of an alkyl methacrylate having more than three carbon atoms in the alkyl group thereof and from 0 to 85 percent by weight of another, different, copolymerizable vinyl monomer.

5. A method for making powder grains comprising aggregated particles of at least two different polymers, (A) and (B), which method comprises spray drying in an air stream an aqueous dispersion consisting essentially of latex particles of said two different polymers such that said powder grains consist essentially of 70 to 99.5 percent by weight of particles of polymer (A), polymer (A) having a dynamic glass transition temperature above 90° C., and from 30 to 0.5 percent by weight of particles of polymer (B), polymer (B) having a dynamic glass transition temperature from 55° C. to 90° C. and which is at least 10 Centigrade degrees less than the dynamic glass transition temperature of polymer (A), said powder particles being separated from the air stream used for drying said aqueous dispersions at a temperature in the range of temperatures between the static glass transition temperature of polymer (A) and the static glass transition temperature of polymer (B), whereby the particles of polymer (A) are not sintered together but the particles of polymer (B) are sintered to one another and to particles of polymer (A).

6. A method as in claim 5 wherein said powder particles are separated from the air stream used for drying said aqueous dispersion at a temperature within the range of temperatures at which polymer (A) has a shear modulus of at least 800N/mm² and polymer (B) has a shear modulus not greater than 800N/mm².

7. Powder particles made by the method of claim 5.

* * * * *